(12) United States Patent
Endo (10) Patent No.: US 9,129,594 B2
(45) Date of Patent: Sep. 8, 2015

(54) SIGNAL PROCESSING APPARATUS AND SIGNAL PROCESSING METHOD

(71) Applicant: FUJITSU LIMITED, Kawaskai-shi, Kanagawa (JP)

(72) Inventor: Kaori Endo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 14/157,601

(22) Filed: Jan. 17, 2014

(65) Prior Publication Data

US 2014/0297270 A1      Oct. 2, 2014

(30) Foreign Application Priority Data

Mar. 28, 2013   (JP) ................................. 2013-070337

(51) Int. Cl.
```
G10L 19/012       (2013.01)
G10L 21/00        (2013.01)
H04M 9/08         (2006.01)
H04B 3/20         (2006.01)
G10L 21/043       (2013.01)
G10L 21/0208      (2013.01)
```
(52) U.S. Cl.
CPC ........... *G10L 19/012* (2013.01); *G10L 21/0208* (2013.01); *G10L 21/043* (2013.01); *H04M 9/082* (2013.01); *G10L 2021/02082* (2013.01)

(58) Field of Classification Search
CPC ..... G10L 21/0208; G10L 21/02; G10L 25/84; G10L 21/0364; G10L 21/045; H04R 3/005; H04M 9/082; G06F 13/10; G06F 13/40; H03G 3/3089; H03G 3/341
USPC .................. 704/206, 223, 229, 275, E15.045, 704/E21.004; 381/57, 86, 107, 110; 379/428.01, 433.01, 406.01, 406.05, 379/406.08; 370/278, 289, 290
See application file for complete search history.

(56) References Cited

U.S. PATENT DOCUMENTS

| | | | | |
|---|---|---|---|---|
| 5,267,323 | A  * | 11/1993 | Kimura .......................... | 381/110 |
| 5,606,550 | A  * | 2/1997  | Jangi ............................. | 370/289 |
| 6,674,865 | B1 * | 1/2004  | Venkatesh et al. ............ | 381/107 |
| 7,596,384 | B2 * | 9/2009  | Hayduk ....................... | 455/550.1 |
| 9,015,038 | B2 * | 4/2015  | Vaillancourt et al. ......... | 704/206 |
| 2004/0179676 | A1 | 9/2004 | Okuda et al. | |

FOREIGN PATENT DOCUMENTS

| | | |
|---|---|---|
| JP | 2001-016319 | 1/2001 |
| JP | 2009-105666 | 5/2009 |
| JP | 2011-033789 | 2/2011 |

OTHER PUBLICATIONS

EESR—Extended European Search Report dated Jun. 2, 2014 issued with respect to the corresponding European Application No. 14150801.0.

\* cited by examiner

*Primary Examiner* — Charlotte M Baker
(74) *Attorney, Agent, or Firm* — Fujitsu Patent Center (57) ABSTRACT

A signal processing apparatus feeding a frame of a signal in frequency domain of a reception voice signal into a sound echo canceler includes a first reception section for receiving frames of the reception voice signal in frequency domain before having a rate-of-speech change process applied; a second reception section for receiving frames of a signal in time domain having the rate-of-speech change process applied by units of frames; and a frequency-domain frame synthesis section for synthesizing a frame of the signal in frequency domain of the reception voice signal based on the signal in time domain having the rate-of-speech change process applied at a frame currently being processed by the signal processing apparatus, and a frame of the reception voice signal in frequency domain corresponding to the signal in time domain having the rate-of-speech change process applied.

9 Claims, 8 Drawing Sheets

SIGNAL PROCESSING APPARATUS AND SIGNAL PROCESSING METHOD

CROSS-REFERENCE TO RELATED APPLICATIONS

This application is based upon and claims the benefit of priority of the prior Japanese Priority Application No. 2013-070337 filed on Mar. 28, 2013, the entire contents of which are hereby incorporated by reference.

FIELD

The disclosures herein generally relate to a signal processing apparatus and a signal processing method.

BACKGROUND

A full-duplex transceiver for a phone call such as a telephone includes a microphone and a loudspeaker. In this case, echoes may be generated if the microphone picks up sound output from the loudspeaker and the sound is output from the loudspeaker via a network. Such kind of echo is called "sound echo". A process to avoid sound echo is called "sound echo canceling". And a processing section for managing the process of sound echo canceling is called a "sound echo canceler".

If using a hands-free function with a usual fixed-line phone or a cellular phone, acoustic feedback from the loudspeaker to the microphone is greater. Therefore, to realize a clear phone call, it is very important to perform sound echo canceling. It is the same as in a telephone conference system and the like. Acoustic feedback from the loudspeaker to the microphone also occurs with ordinary usage of a usual fixed-line phone or a cellular phone. Therefore, it is important to perform sound echo canceling.

Methods of sound echo canceling include a method that processes a voice signal in time domain, a method that processes a voice signal by transforming the voice signal into a signal in frequency domain, and the like. It is common with telephones nowadays that a voice signal detected by a microphone is transformed into a digital signal by an AD converter to have digital signal processing applied. In this case, a sound echo canceler generally uses a signal obtained by transforming a digital signal in time domain into frequency domain.

Also, there are telephones that have a rate-of-speech change function installed, which changes the reproducing speed of voice of a phone-call partner slower or faster while keeping the pitch of the voice. When used for a phone call, the rate-of-speech change function is mainly used for slowing down the speed of voice to make it easier to hear the voice of a phone-call partner.

As seen from the above, a telephone requires multiple processes in time domain as well as in frequency domain. In many cases, digital signal processing is applied by units of frames where a frame includes multiple sampling values of a digital signal. Widely used frame-based digital signal processing includes time-frequency transform where a frame of a signal in time domain is transformed into a frame of the signal in frequency domain, and frequency-time transform where a frame of a signal in frequency domain is transformed into a frame of the signal in time domain.

Figure 1:
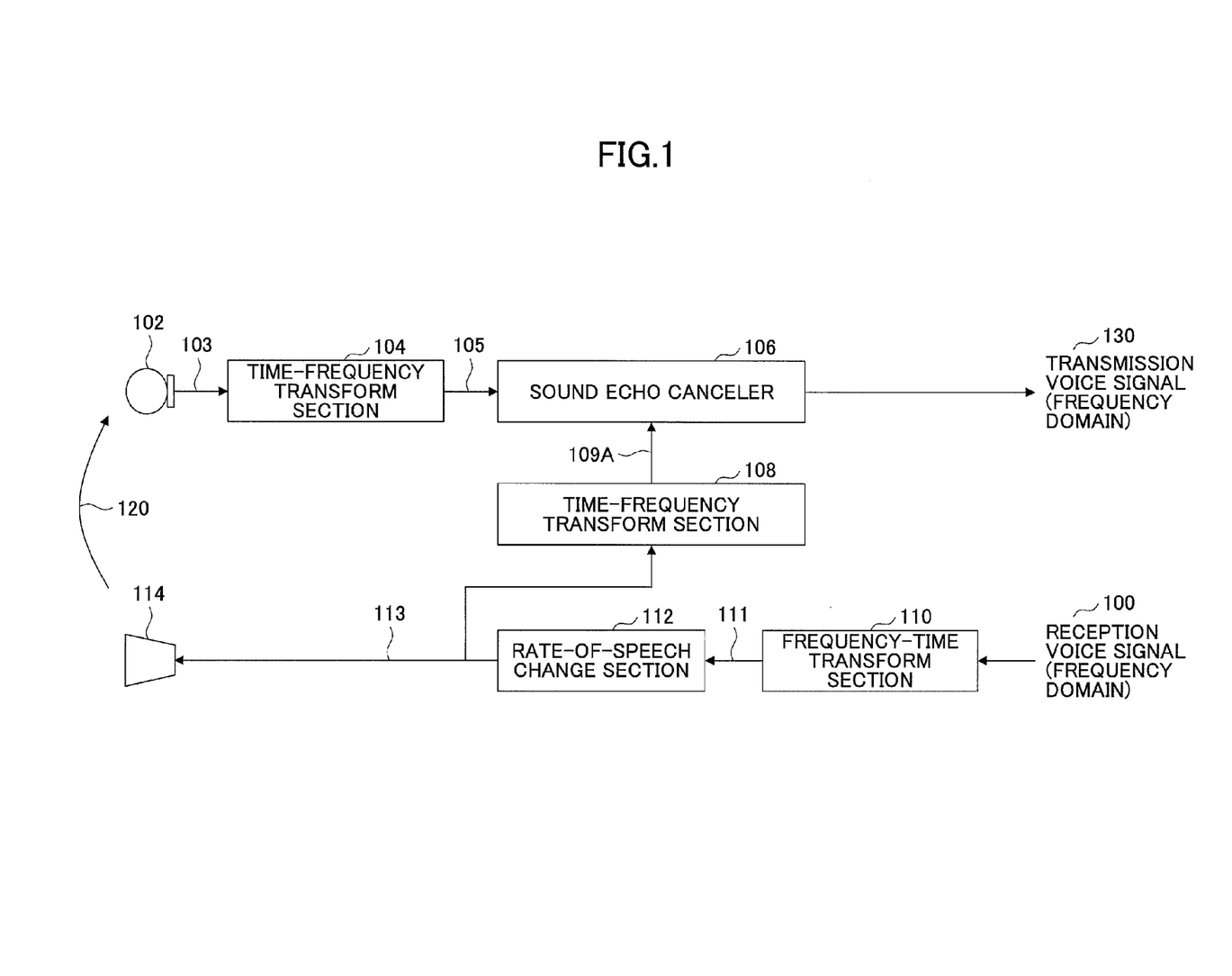
FIG. 1 is a schematic view illustrating a relationship between a rate-of-speech change process and an embodiment.

FIG. 1 illustrates an example of a functional block diagram of a telephone. A reception voice signal 100 is a signal in frequency domain of a reception voice signal that may have processes applied including an AGC process, a noise reduction process, a voice emphasis process, and the like (not illustrated).

A frequency-time transform section 110 transforms the reception voice signal in frequency domain 100 into a signal in time domain 111, and feeds it into a rate-of-speech change section 112. The rate-of-speech change section 112 applies a rate-of-speech change process to the signal in time domain 111, outputs a signal after rate-of-speech change in time domain 113 to a loudspeaker 114 and to a time-frequency transform section 108.

The time-frequency transform section 108 transforms the signal after rate-of-speech change in time domain 113 into a signal in frequency domain 109A, and feeds it into a sound echo canceler 106.

An analog sound signal 120 output from the loudspeaker 114 reaches a microphone 102 through the air and the housing of the telephone. The microphone 102 transforms a part of the analog sound signal 120 from the loudspeaker 114 into a digital transmission voice signal in time domain 103. Here, AD converters, DA converters, amplifiers, and the like are not illustrated for the sake of simplicity.

A time-frequency transform section 104 transforms the transmission voice signal in time domain 103 into a transmission voice signal in frequency domain 105, and feeds it into the sound echo canceler 106.

Here, there exists a transfer characteristic specific to a signal transfer path starting from the rate-of-speech change section 112 to the sound echo canceler 106 via the loudspeaker 114, the microphone 102, and the time-frequency transform section 104. The transmission voice signal in frequency domain 105 has the signal after rate-of-speech change in time domain 113 as its source that is mixed with a signal that is affected by the transfer characteristic. The mixed signal is a cause of sound echo.

The sound echo canceler 106 processes the transmission voice signal in frequency domain 105, for example, to cancel the mixed signal by using the signal in frequency domain 109A and an adaptive filter (not illustrated) in frequency domain based on the transfer characteristic. This process suppresses generation of sound echo. The sound echo canceler 106 outputs a transmission voice signal in frequency domain 130 having sound echo suppressed.

Here, there exists a technology that provides a rate-of-speech change section for changing a time axis of a voice signal of a phone call partner transmitted via a telephone communication channel and an echo canceler section for deleting a sidetone signal (echo), in which a sidetone is removed by the echo canceler section provided at the previous stage of the rate-of-speech change section so that the sidetone does not reach the rate-of-speech change section to prevent the sidetone having a rate-of-speech change applied from hindering the phone call partner's talk (see, for example, Patent Document 1).

Also, there exists a technology in that a rate-of-speech change device for applying an adaptive rate-of-speech change to an input signal includes a physical index calculation section for calculating a physical index for each segment of the input signal obtained by dividing the input signal with unit times, and a rate-of-speech change factor determination section for determining a magnification factor of rate-of-speech change specified for each of the segments of the input signal to perform rate-of-speech change depending on the physical index calculated by the physical index calculation section. With this technology, rate-of-speech change can be stably applied to an input signal in which background sound and voice are mixed (see, for example, Patent Document 2).

RELATED-ART DOCUMENTS

Patent Documents

[Patent Document 1] Japanese Laid-open Patent Publication No. 2001-16319
[Patent Document 2] Japanese Laid-open Patent Publication No. 2011-33789

As described above, if adopting a method of sound echo canceling that requires a signal in frequency domain, a signal in time domain after a rate-of-speech change needs to be transformed into a signal in frequency domain. If a signal in frequency domain is available before the rate-of-speech change, the signal in frequency domain needs to be transformed into a signal in time domain for the rate-of-speech change.

Therefore, to provide a signal in frequency domain after the rate-of-speech change to a sound echo canceler, the signal after the rate-of-speech change needs to be transformed into frequency domain again by a time-frequency transform. This means considerable resources are required for signal transformation.

SUMMARY

According to at least one embodiment of the present invention, a signal processing apparatus feeding a frame of a signal in frequency domain of a reception voice signal into a sound echo canceler includes a first reception section for receiving frames of the reception voice signal in frequency domain before having a rate-of-speech change process applied; a second reception section for receiving frames of a signal in time domain having the rate-of-speech change process applied by units of frames; and a frequency-domain frame synthesis section for synthesizing a frame of the signal in frequency domain of the reception voice signal based on the signal in time domain having the rate-of-speech change process applied at a frame currently being processed by the signal processing apparatus, and a frame of the reception voice signal in frequency domain corresponding to the signal in time domain having the rate-of-speech change process applied.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments of the present invention will be described with reference to the drawings. The same elements across the drawings are assigned the same numerical codes.

Figure 2:
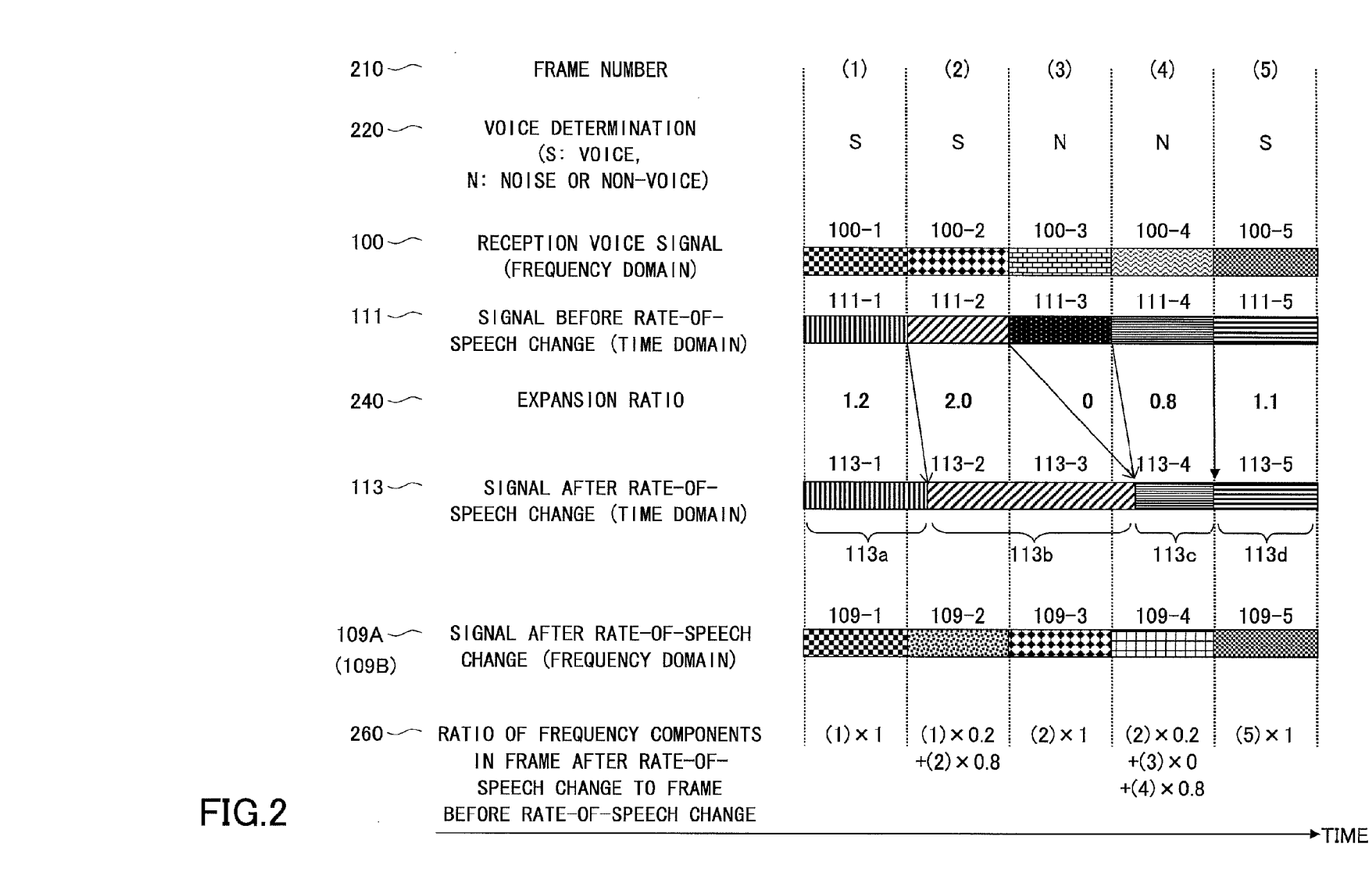
FIG. 2 is a schematic view illustrating a relationship between signal processing relevant to a rate-of-speech change process and an embodiment of the present invention.

FIG. 2 illustrates a relationship between signal processing relevant to a rate-of-speech change process and an embodiment of the present invention.

Digital signal processing in the present embodiment may process a predetermined number of digital values as a single frame. For example, data of a sound signal may be sampled with a sampling frequency of 8 kHz, and 160 samples may be processed as one frame. In this case, one frame is 20 ms long. Various data processing can be performed by units of frames. Also, if applying time-frequency transform to data with 256 samples, it is transformed into a signal in frequency domain having 128 bins of frequencies (spectrum) according to the sampling theorem. Also, Fourier transform (FFT) and inverse Fourier transform (IFFT), for example, can be used as time-frequency transform and frequency-time transform described below. Here, the transform is not limited to Fourier transform.

Also, in the following description, various signal processing is sequentially performed by units of frames. Here, to avoid processing delay for a signal, it is desirable to design all signal processing short enough so that the time for processing is less than a time of one frame. Here, in FIG. 2, frames with the same frame number are arranged vertically for the sake of explanation, although a time for processing one frame depends on processes.

Here, in the present specification, a signal obtained by applying time-frequency transform to a signal in time domain is called a "signal in frequency domain". Also, a frame containing a predetermined pieces of sampled data is called a "frame of a signal in time domain". In addition, a frame of a signal obtained by applying time-frequency transform to a frame of a signal in time domain is called a "frame of a signal in frequency domain".

In FIG. 2, uppermost frame numbers 210 represent numbers assigned to frames, respectively. Voice determination 220 may be executed, for example, by the rate-of-speech change section 112. If a reception voice signal received via a communication channel is determined as voice, it is designated with "S", or if it is determined as non-voice such as noise, it is designated with "N".

A reception voice signal is determined whether it is voice as above for the rate-of-speech change section 112 to expand a part of the reception voice signal corresponding to voice, and to cut (or to compress) a part corresponding to non-voice. In this way, the rate-of-speech change section 112 compresses non-voice parts between words to absorb time of expanded voice parts. Voice determination 220 may be implemented with a voice detection technique known to those skilled in the art.

A part of the reception voice signal determined as voice is expanded by multiplying a magnification factor among predetermined expansion magnification factors. As a rate-of-speech change technology, various technologies have been proposed, for example, the PICOLA method, the STRAIGHT method, and the like. In the present embodiment, a rate-of-speech change technology known to those skilled in the art may be used. Therefore, description of rate-of-speech change technologies is omitted in the present specification.

The reception voice signal 100 in FIG. 2 is a signal in frequency domain. A signal received from a communication channel is transformed into the signal in frequency domain to have a variety of signal processing applied in frequency domain, for example, an AGC process, an emphasis process, and a noise reduction process (not illustrated). The reception voice signal 100 may have these varieties of signal processing applied if necessary.

Frames of the reception voice signal in frequency domain 100 (frames 100-1 to 100-5) are transformed into frames of a signal before rate-of-speech change in time domain 111 (frames 111-1 to 111-5) by units of frames in order at the frequency-time transform section 110. It is desirable to transform into a signal in time domain because the rate-of-speech change process uses a signal in time domain.

Using expansion ratios 240 illustrated in FIG. 2, the rate-of-speech change section 112 expands or compresses respective frames. In the present embodiment, an expansion ratio for a voice part is greater than one in order to expand the part. The length of a non-voice part frame is compressed or set to zero to compensate for expanded lengths for voice parts. Here, expansion ratios do not take a constant value so that natural expansion is realized that depends on voice patterns of respective frames.

FIG. 2 also illustrates an example of a signal after rate-of-speech change in time domain 113. Namely, the frame 111-1 is expanded to 1.2 times to obtain a signal 113a. The frame 111-2 is expanded to 2.0 times to obtain a signal 113b. The frame 111-3 is cut (reduced to zero times) because it is a non-voice part to be deleted. Although the frame 111-4 is also a non-voice part, it is reduced to 0.8 times to obtain a signal 113c, to fill in for the frame number (4). The frame 111-5 is expanded to 1.1 times to obtain a signal 113d. Here, it is assumed that the frames up to the frame number (5) are frames that have been processed by the current time, and the current time goes just ahead of the frame number (5). Therefore, no frames after the frame number (5) are illustrated.

In a telephone, voice processing is performed in real-time. Therefore, it is desirable to have a frame obtained just before the current time as a frame to be processed for sound echo canceling or the like. However, completeness of real-time processing cannot be guaranteed because AD/DA transform, time-frequency transform, frequency-time transform, and the like are performed by units of frames, which is similar to other digital signal processing.

Using the time-frequency transform section 108 illustrated in FIG. 1, for example, a signal after rate-of-speech change in frequency domain 109A in FIG. 2 is obtained (frames 109-1 to 109-5).

First, the frame number (1) is analyzed in detail as follows. Namely, for the frame number (1), the frame 111-1 of the signal before rate-of-speech change is expanded to 1.2 times to obtain the signal after rate-of-speech change in time domain 113a. Here, the rate-of-speech change expands the time length of voice while maintaining the pitch of the voice. Therefore, for the frame number (1), the frame 100-1 of the reception voice signal may have the same (or substantially the same, strictly speaking) frequency components as the frame 109-1 after rate-of-speech change.

It is assumed that the rate-of-speech change operates while keeping the pitch of voice, without changing frequency components, and based on the assumption, a rate-of-speech change process is designed so that only the length of voice changes. With an actually implemented rate-of-speech change process, little fluctuation of frequency components is observed.

Therefore, in general, frequency components remain unchanged between a frame after rate-of-speech change that is obtained by expanding a corresponding frame before rate of speech change, and the corresponding frame before rate of speech change. Therefore, the following respective pairs of frames have the same (or substantially the same, strictly speaking) frequency components: the frame 100-1 and the frame 109-1; the frame 100-2 and the frame 109-3; and the frame 100-5 and the frame 109-5.

Next, the frame number (2) in FIG. 2 is analyzed as an example in the following.

Namely, in the frame 113-2 of the signal after rate-of-speech change in time domain, the signal corresponding to the frame 111-1 (or the signal 113a) occupies about 20%, and the signal corresponding to the frame 111-2 (or the signal 113b) occupies about 80%. Therefore, according to the ergodic hypothesis, the frame 109-2 of the signal after rate-of-speech change in frequency domain includes 20% of the frequency components of the frame 100-1 and 80% of the frequency components of the frame 100-2.

In the row designated with a numerical code 260 in FIG. 2, ratios of frequency components are illustrated in simplified forms for each of the frames where respective ratios of the frequency components of the frames before rate-of-speech change included in the signal after rate-of-speech change are represented in a formula as respective factors of terms.

As seen from the above, a signal after rate-of-speech change in frequency domain can be estimated by units of frames from a signal before rate-of-speech change in frequency domain and information about expansion ratios of the signal after rate-of-speech change in time domain.

This can be represented in a general formula as follows.

$$P(n_0, f) = \sum_{k=0}^{m} \alpha_{-k} F(n_{-k}, f) \quad (1)$$

where $P(n_0, f)$ is the amplitude of a frequency component f of a frame $n_0$ of a signal after rate-of-speech change in frequency domain;

$F(n_{-k}, f)$ is the amplitude of a frequency component f of a frame $n_{-k}$ of the signal before rate-of-speech change in frequency domain; and $\alpha_{-k}$ is the ratio of a signal after rate-of-speech change, which is obtained from the frame $n_{-k}$ of the signal before rate-of-speech change in time domain, in the $n_0$ frame.

Here, a subscript represents a temporal order where $n_0$ represents a frame number that is currently being processed. A frame $n_{-1}$ precedes the frame $n_0$ by one frame unit in time (in the past). Therefore, a frame $n_{-m}$ precedes the frame $n_0$ by m frame units in time (in the past). The value of m may be set to designate a frame closest to the current time among frames of the signal before rate-of-speech change in frequency domain that are used for the previous processing phase.

For example, for the frame number (1) in FIG. 2, m=0 and $\alpha_0=1$ are used for the above formula. For the frame number (2), m=1, $\alpha_0=0.8$, and $\alpha_{-1}=0.2$. For the frame number (3), m=1, $\alpha_0=0$, and $\alpha_{-1}=1$. For the frame number (4), m=2, $\alpha_0=0.8$, $\alpha_{-1}=0$, and $\alpha_{-1}=0.2$. For the frame number (5), m=0, $\alpha_0=1$.

Figure 3:
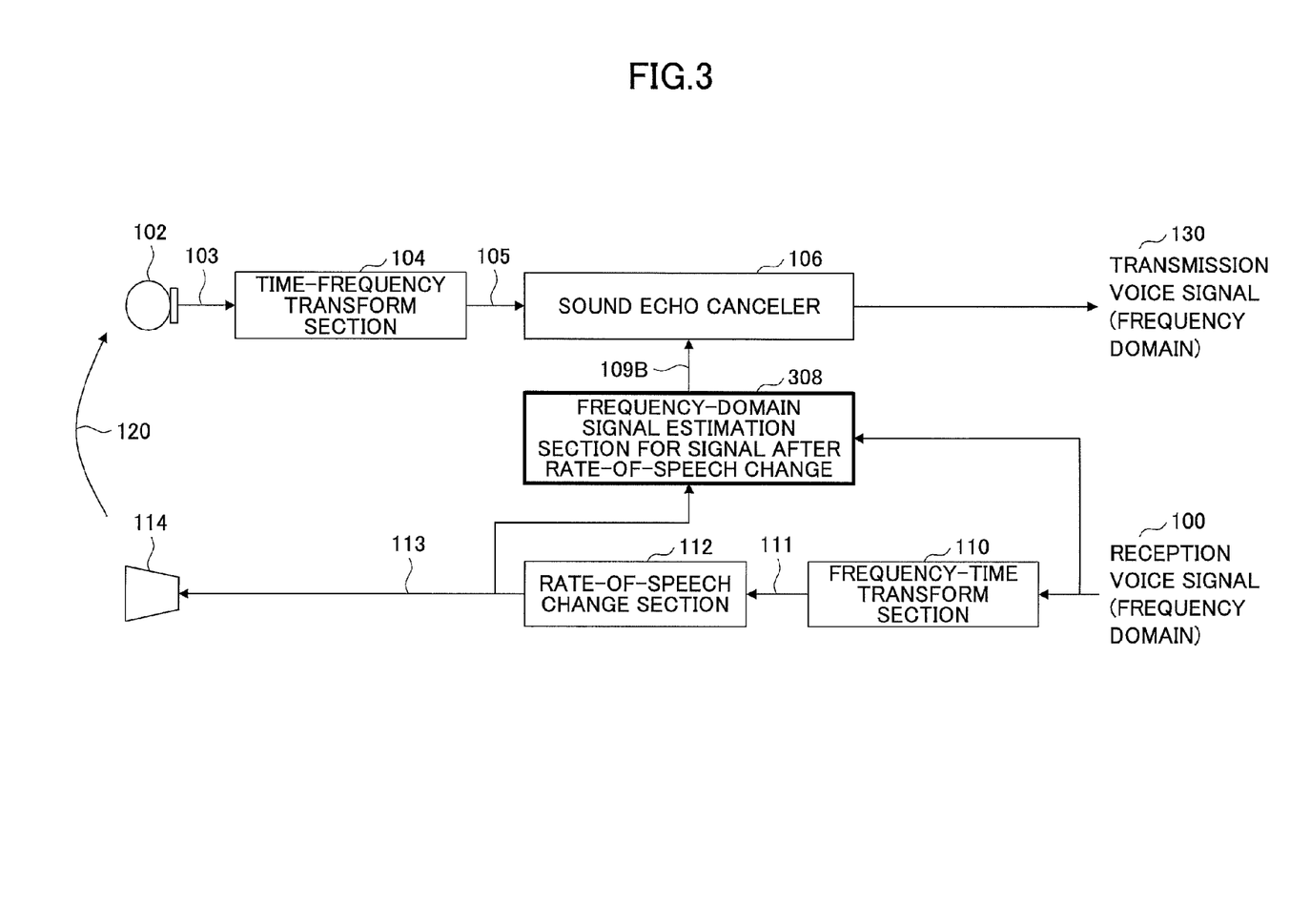
FIG. 3 is a functional block diagram of an embodiment.

FIG. 3 illustrates a functional block diagram of the present embodiment. In FIG. 3, the time-frequency transform section 108 in FIG. 1 is replaced with a frequency-domain signal estimation section for a signal after rate-of-speech change 308 according to the present embodiment. The other elements in FIG. 3 may be the same as in FIG. 1.

The frequency-domain signal estimation section for a signal after rate-of-speech change 308 in FIG. 3 feeds a signal after rate-of-speech change in frequency domain 109B to a sound echo canceler 106 that is estimated using the formula (1) with a signal transformed into frequency domain 109A in FIG. 2. For the estimation, the frequency-domain signal estimation section for a signal after rate-of-speech change 308 receives and utilizes a signal after rate-of-speech change in time domain 113 and a reception voice signal in frequency domain 100.

A sound echo canceler 106 in FIG. 3 can be implemented with one of various methods known to those skilled in the art. For example, the sound echo canceler 106 may simply subtract the estimated signal in frequency domain 109B from a transmission voice signal in frequency domain 105 so that a signal is obtained in which a mixed signal that would go into the sound echo canceler 106 via a loudspeaker 114, a microphone 102, and a time-frequency transform section 104 can be canceled in the signal after rate-of-speech change in time domain 113.

Alternatively, as noted earlier, there exists a transfer characteristic specific to a signal transfer path starting from the rate-of-speech change section 112 to the sound echo canceler 106 via the loudspeaker 114, the microphone 102, and the time-frequency transform section 104. The transmission voice signal in frequency domain 105 has the signal after rate-of-speech change in time domain 113 as its source that is mixed with a signal that is affected by the transfer characteristic. The mixed signal is a cause of sound echo. The sound echo canceler 106 processes the transmission voice signal in frequency domain 105, for example, to cancel the mixed signal by using the signal in frequency domain 109B and an adaptive filter (not illustrated) in frequency domain based on the transfer characteristic.

Also, sound echo canceling may be performed combined with signal processing in time domain.

The frequency-domain signal estimation section for a signal after rate-of-speech change 308 in the present embodiment may use any type of a sound echo canceler 106 that processes a signal in frequency domain. The frequency-domain signal estimation section for a signal after rate-of-speech change 308 is an example of a signal processing apparatus.

Figure 4:
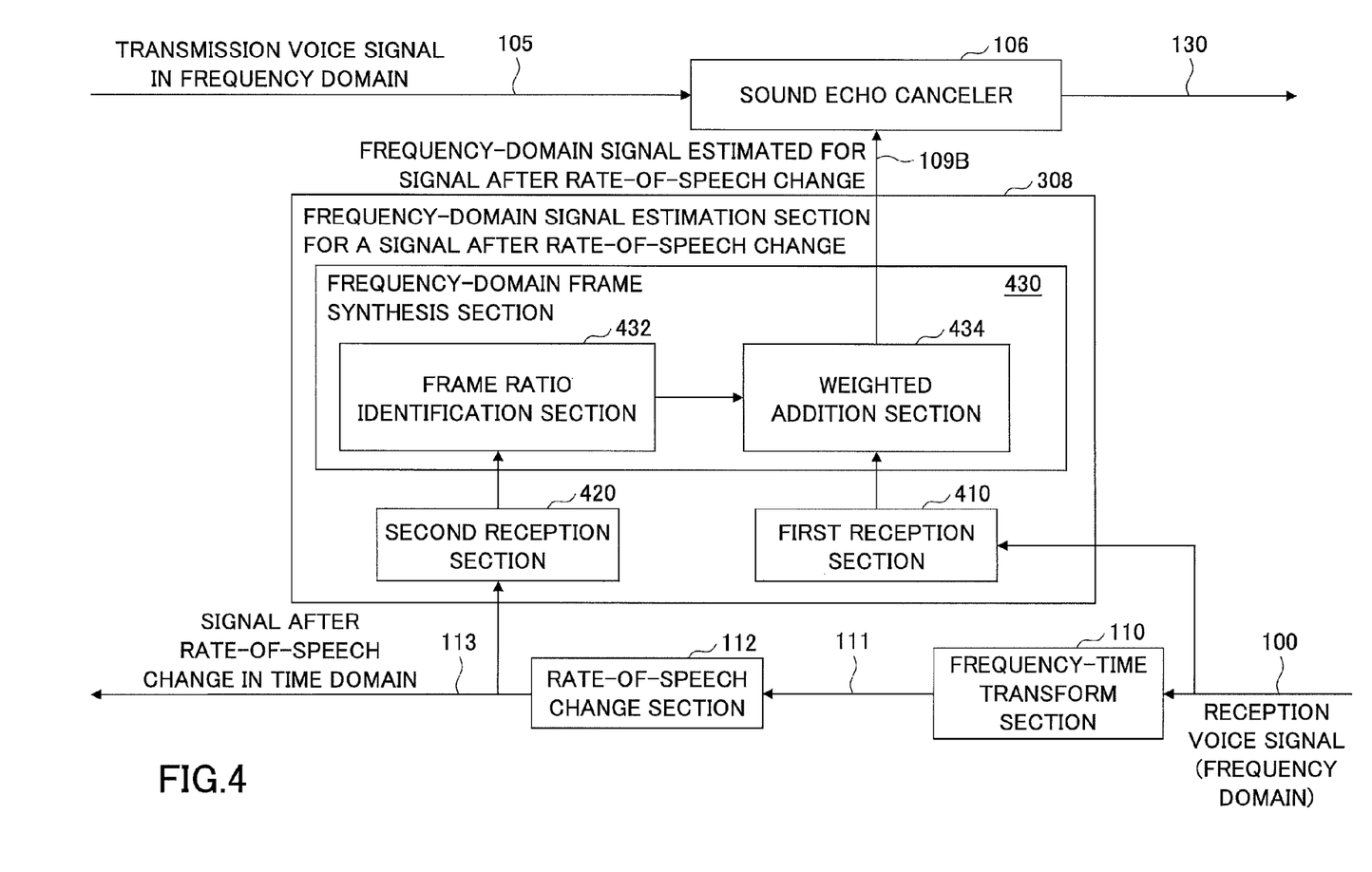
FIG. 4 is a detailed functional block diagram of an embodiment.

FIG. 4 is a detailed functional block diagram of the present embodiment. The frequency-domain signal estimation section for a signal after rate-of-speech change 308 may include a first reception section 410, a second reception section 420, and a frequency-domain frame synthesis section 430.

Also, the frequency-domain frame synthesis section 430 may include a frame ratio identification section 432 and a weighted addition section 434.

The first reception section 410 receives a reception voice signal in frequency domain 100. In addition, the first reception section 410 may feed the received reception voice signal in frequency domain 100 into the weighted addition section 434.

The second reception section 420 receives a signal after rate-of-speech change in time domain 113. In addition, the second reception section 420 may feed the received signal after rate-of-speech change in time domain 113 into the frame ratio identification section 432.

The frame ratio identification section 432 checks content of the signal after rate-of-speech change in time domain 113 included in a frame currently being processed as illustrated in FIG. 2. For example, if the frame number (2) in FIG. 2 is the frame currently being processed, the signal 113a and the signal 113b are identified as being included in the frame 113-2 of the signal after rate-of-speech change in time domain 113, and ratios of the signal 113a and the signal 113b in the frame 113-2 (namely, 0.2 and 0.8, respectively) are also identified. The frame ratio identification section 432 feeds the identified information into the weighted addition section 434.

Here, a "frame currently being processed" is preferably a frame that has been sampled most recently relative to the current time. This is because it is important for a communication device such as a telephone to perform voice processing or the like with a time delay as short as possible if the present embodiment is applied.

Next, the weighted addition section 434 identifies, for example, the frame 100-1 of the reception voice signal in frequency domain 100 from the received signal 113a, and also identifies the frame 100-2 of the reception voice signal in frequency domain 100 from the signal 113b.

Based on the information, the weighted addition section 434 executes calculation specified below to obtain a signal in frequency domain 109B (P(2, f)) that estimates a signal after rate-of-speech change.

$$P(2,f)=0.2\times F(1,f)+0.8\times F(2,f)$$

A formula for obtaining the signal in frequency domain 109B that estimates a signal after rate-of-speech change has already been described with the formula (1).

Here, it is desirable that the first reception section and the second reception section store the received information into a memory in order. It is also desirable that the first reception section and the second reception section store which part of the received information has been utilized by the frequency-domain frame synthesis section 430. By storing the information, it is possible for the frequency-domain signal estimation section for a signal after rate-of-speech change 308 to easily identify information to be processed with the next frame.

Figure 5:
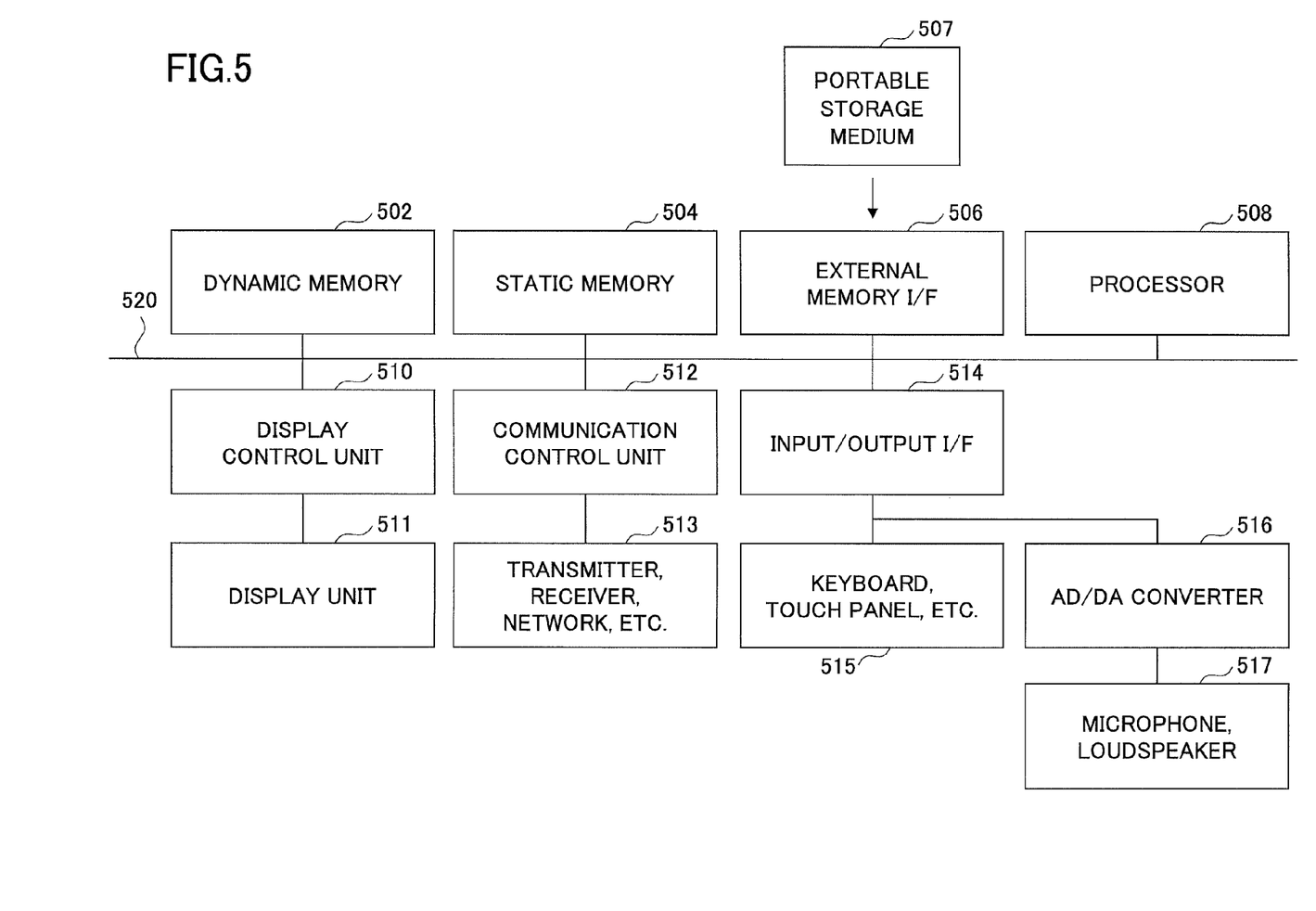
FIG. 5 is a hardware configuration diagram of an embodiment.

FIG. 5 illustrates a hardware configuration for implementing the embodiment, for example, illustrated in FIGS. 3-4.

The hardware of the present embodiment may include a dynamic memory 502, a static memory 504, an external memory interface 506, a processor 508, a display control unit 510, a communication control unit 512, and an input/output interface 514. These units are connected with each other via a bus 520.

A display unit 511 is connected with the display control unit 510. A transmitter, a receiver, a network, etc., 513 are connected with the communication control unit 512. A keyboard, a touch panel, etc., 515 are connected with the input/output interface 514. Also, a microphone, a loudspeaker, etc., 517 are connected with the input/output interface 514 via an AD/DA converter 516.

Also, the external memory interface 506 can make read/write access to a portable recording medium 507.

The dynamic memory 502, the static memory 504, or the portable recording medium 507 may store a part of or all of a program implementing the present embodiment, as well as management information such as the source of the program, versions of the source, and the like. A part of or all of the program that implements the present embodiment can be executed by the processor 508.

A part of or all of the present embodiment illustrated in FIGS. 3-4 may be implemented with the hardware illustrated in FIG. 5.

Also, a part of or all of the present embodiment may be implemented by a DSP (digital signal processor, not illustrated).

The program may be stored into the portable recording medium 507. The portable recording medium 507 is one or more non-transitory storage media having a structure. For example, the portable recording medium 507 may be a magnetic storage medium, an optical disk, an optical-magnetic storage medium, a non-volatile memory, or the like. A magnetic storage medium may be an HDD, a flexible disk (FD), a magnetic tape (MT), or the like. An optical disk may be a DVD (Digital Versatile Disc), a DVD-RAM, a CD-ROM (Compact Disc-Read Only Memory), a CD-R (Recordable)/RW (ReWritable), or the like. Also, an optical-magnetic storage medium may be an MO (Magneto-Optical disk), or the like. A non-volatile memory may be an SD memory, a USB memory, or the like. By loading the program stored in the portable recording medium 507 to have a processor execute the program, all or a part of the present embodiment may be executed.

Figure 6:
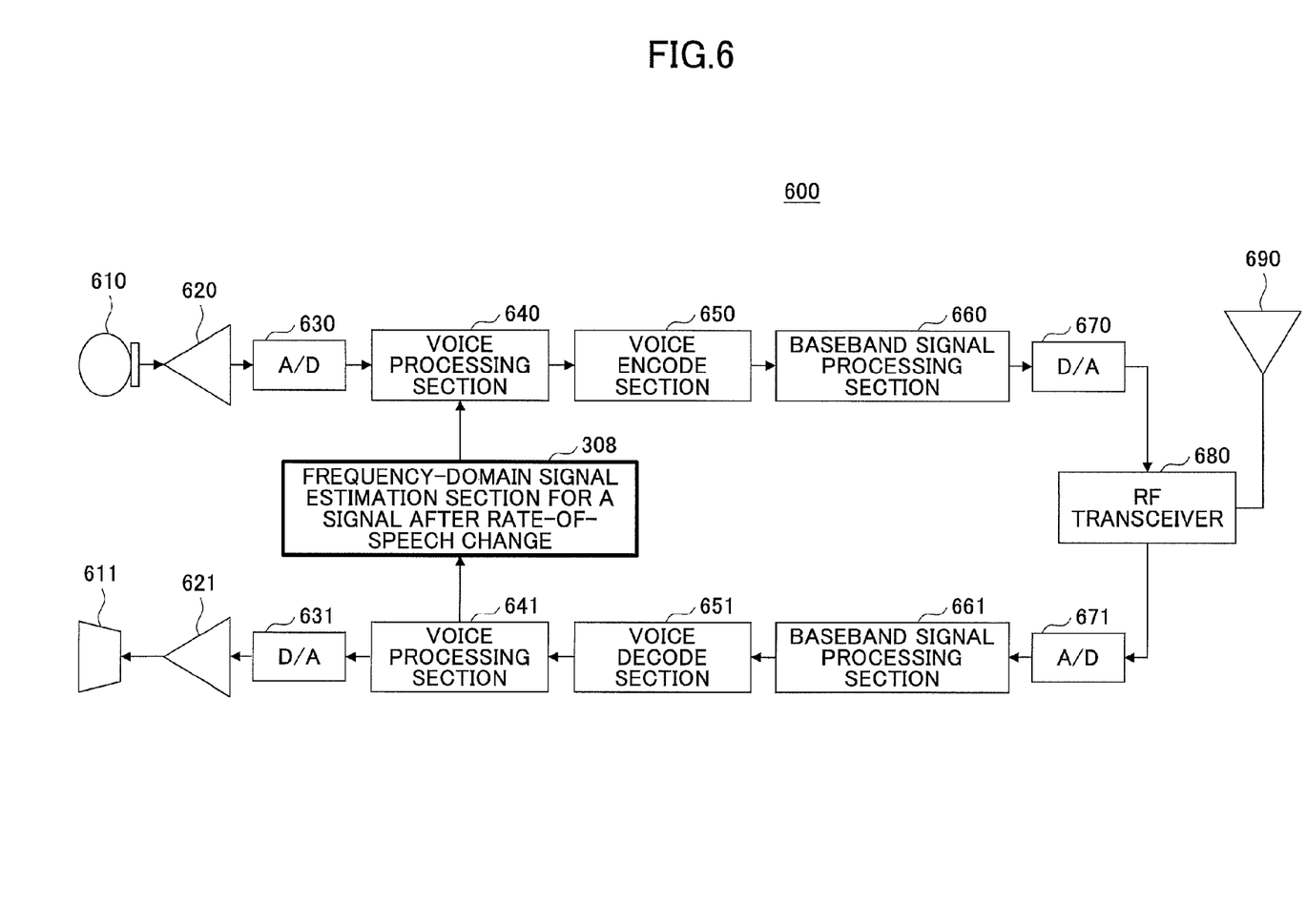
FIG. 6 is a configuration diagram of a portable terminal of an embodiment.

FIG. 6 illustrates a configuration of a portable terminal 600 according to the present embodiment. The portable terminal 600 may include a microphone 610 to input transmission voice, an amplifier 620 to amplify the transmission voice, an AD converter 630 to transform the transmission voice into a digital signal, and a voice processing section 640 to process the transmission voice. The portable terminal 600 may further include a voice encode section 650 to encode the transmission voice and a baseband signal processing section 660 to apply a baseband process to the digital signal of the transmission voice. The portable terminal 600 may further include a DA converter 670 to transform the baseband signal into an analog signal, an RF transceiver 680 to transmit and receive a wireless signal, and an antenna 690 to emit the wireless signal into the air and to receive the wireless signal. The portable terminal 600 may further include an AD converter 671 to transform a reception voice signal into a digital signal and a baseband signal processing section 661 to apply a baseband process to the digital signal of the reception voice signal. The portable terminal 600 may further include a voice decode section 651 to decode the reception voice signal and a voice processing section 641 to process the reception voice signal. The portable terminal 600 may further include a DA converter 631 to transform the reception voice signal into an analog signal, an amplifier 621 to amplify the reception voice signal, a loudspeaker 611 to output the reception voice signal, and a frequency-domain signal estimation section for a signal after rate-of-speech change 308.

The frequency-domain signal estimation section for a signal after rate-of-speech change 308 has been described with FIGS. 3-4.

Figure 7:
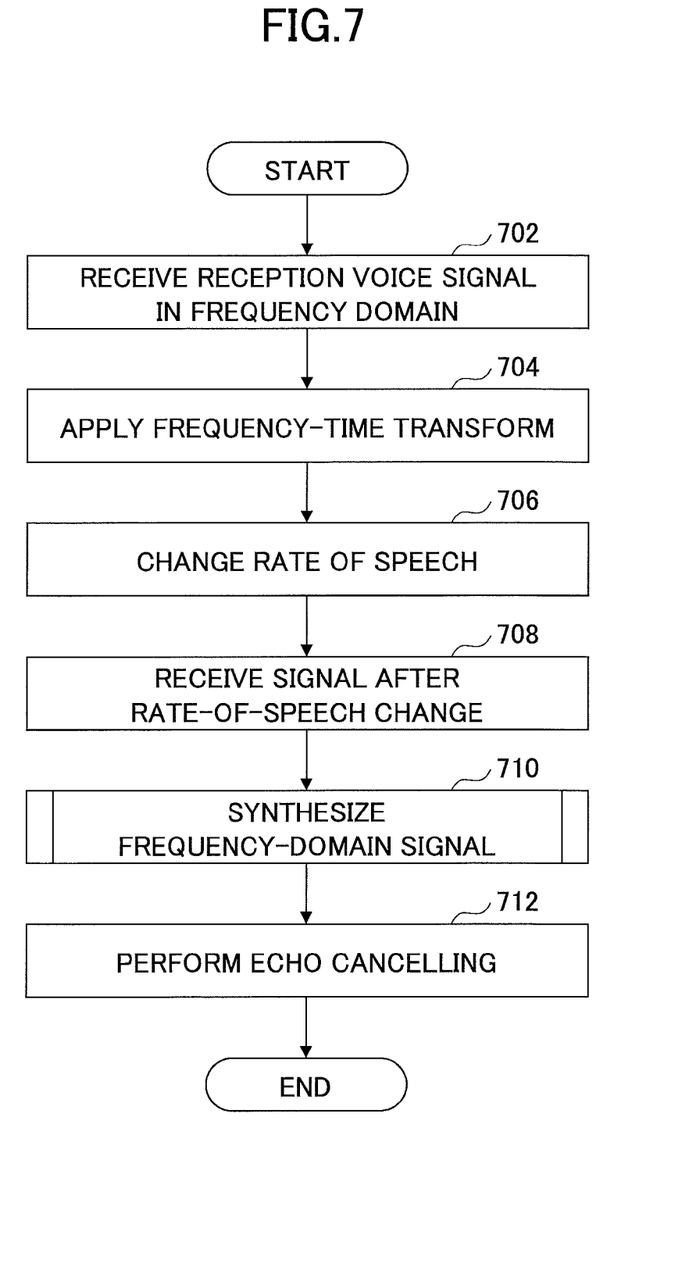
FIG. 7 is a flowchart summarizing a method of an embodiment.

FIG. 7 is a flowchart summarizing a method of the present embodiment.

At Step 702, the first reception section 410 receives a reception voice signal in frequency domain 100.

At Step 704, the frequency-time transform section 110 transforms the reception voice signal in frequency domain 100 into a signal in time domain 111.

At Step 706, the rate-of-speech change section 112 applies a rate-of-speech change process to the signal in time domain 111.

At Step 708, the second reception section 420 receives a signal after rate-of-speech change 113.

At Step 710, the frequency-domain frame synthesis section 430 synthesizes (estimates) a signal after rate-of-speech change in frequency domain from the reception voice signal in frequency domain 100 and the signal after rate-of-speech change 113.

At Step 712, the sound echo canceler 106 cancels sound echo.

With the above procedure, sound echo can be canceled with fewer resources.

Figure 8:
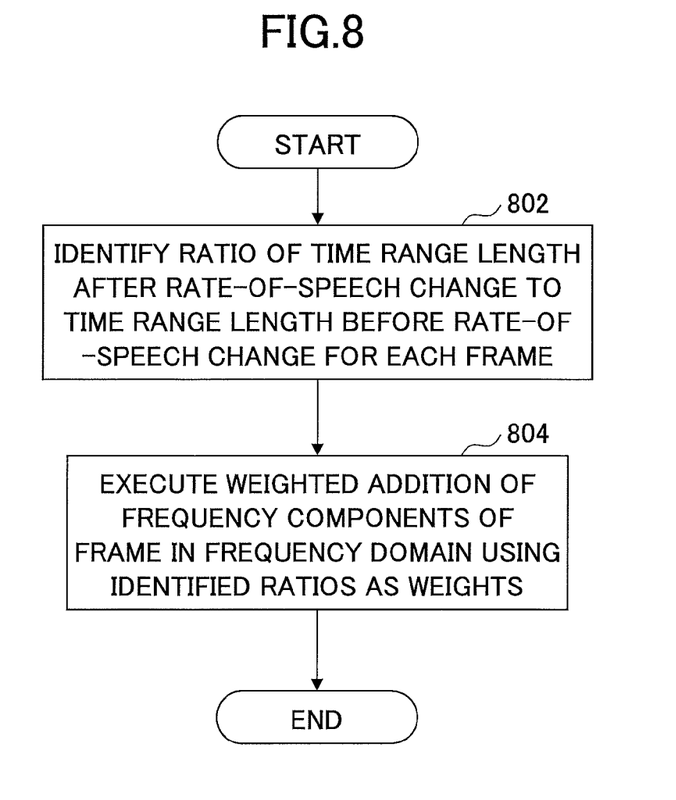
FIG. 8 is a flowchart illustrating an estimation method of a frequency-domain signal of an embodiment.

FIG. 8 is a flowchart illustrating an estimation method of a frequency-domain signal according to the present embodiment.

At Step 802, the frame ratio identification section 432 identifies ratios of time lengths of frames after rate-of-speech change that are included in the time range of a currently processed frame.

At Step 804, the weighted addition section 434 executes weighted addition for frequency components of frames in frequency domain corresponding to signals in time domain that exist in the time range using the respective ratios of the frames. The weighted addition section 434 feeds the estimated signal after rate-of-speech change in frequency domain 109B obtained with the steps above, into the sound echo canceler 106.

With the above procedure, the sound echo canceler 106 can perform canceling of sound echo.

As above, the embodiments of the present invention have been described in detail using the drawings. Here, it is noted that the description above is provided for understanding the embodiments of the present invention, not for limiting the range of the embodiments of the present invention. Also, the multiple embodiments in the description above are not mutually exclusive. Therefore, it is noted that any combinations of different embodiments can be realized unless any contradictions arise. Also, steps of any one of the methods described in claims or any one of the embodiments related to a program may be executed in a different order of the steps or by skipping any of the steps unless any contradictions arise. Alternatively, multiple steps may be executed concurrently. Further, it is obvious that the embodiments are included within a technological range of the claims.

Also, by having a computer read and execute program code, the functions of the embodiments described above can be implemented. Further, if there are cases in which software running on the computer, such as an OS, a virtual machine monitor (VMM), firmware, or BIOS, executes a part or all of processing to implement the functions of the embodiments under control of the program code, it is obvious that these cases are included within the technological range of the claims.

Also, each of the elements in the various embodiments may be implemented by multiple hardware units that are physically separated. Also, each of the elements in the various embodiments may operate on one or more servers. Also, multiple CPUs may execute a program relevant to the embodiments, and each of the CPUs may include multiple cores.

It is obvious that the embodiments above may be applicable not only for telephones, but also for a wide variety of phone call systems that perform full-duplex communication such as TV conference systems, intercoms, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing apparatus feeding a frame of a signal in frequency domain of a reception voice signal into a sound echo canceler, comprising:
    a first reception section configured to receive a plurality of the frames of the reception voice signal in frequency domain before having a rate-of-speech change process applied, the rate-of-speech change process being to be applied for changing a rate of speech of the reception voice signal;
    a second reception section configured to receive a plurality of the frames of a signal in time domain having the rate-of-speech change process applied by units of the frames; and
    a frequency-domain frame synthesis section configured to synthesize the frame of the signal in frequency domain of the reception voice signal to be fed into the sound echo canceler, based on the signal in time domain having the rate-of-speech change process applied at a frame currently being processed by the signal processing apparatus, and a frame of the reception voice signal in frequency domain corresponding to the signal in time domain having the rate-of-speech change process applied.

2. The signal processing apparatus as claimed in claim 1, wherein the frequency-domain frame synthesis section includes a frame ratio identification section configured to identify a ratio of a length of a part of the signal in time domain having the rate-of-speech change process applied included in the frame currently being processed, to a length of the frame currently being processed, for the signal in time domain having the rate-of-speech change process applied,
    wherein the ratio is used for synthesizing the frame of the signal in frequency domain of the reception voice signal.

3. The signal processing apparatus as claimed in claim 2, wherein the frequency-domain frame synthesis section includes a weighted addition section configured to perform a weighted addition on values of frequency components for calculating a frame for the signal in frequency domain of the reception voice signal to be synthesized, each of the values of the frequency components included in the frame of the reception voice signal in frequency domain corresponding to the signal in time domain having the rate-of-speech change process applied, the weighted addition taking the ratio into account.

4. A signal processing method feeding a frame of a signal in frequency domain of a reception voice signal into a sound echo canceler, the method comprising:
    receiving firstly a plurality of the frames of the reception voice signal in frequency domain before having a rate-of-speech change process applied, the rate-of-speech change process being to be applied for changing a rate of speech of the reception voice signal;
    receiving secondly a plurality of the frames of a signal in time domain having the rate-of-speech change process applied by units of the frames; and
    synthesizing the frame of the signal in frequency domain of the reception voice signal to be fed into the sound echo canceler, based on the signal in time domain having the rate-of-speech change process applied at a frame currently being processed by the signal processing apparatus, and a frame of the reception voice signal in frequency domain corresponding to the signal in time domain having the rate-of-speech change process applied.

5. The signal processing method as claimed in claim 4, wherein the synthesizing includes identifying a ratio of a length of a part of the signal in time domain having the rate-of-speech change process applied included in the frame currently being processed, to a length of the frame currently being processed, for the signal in time domain having the rate-of-speech change process applied,
    wherein the ratio is used for synthesizing the frame of the signal in frequency domain of the reception voice signal.

6. The signal processing method as claimed in claim 5, wherein the synthesizing includes performing a weighted addition on values of frequency components for calculating a frame for the signal in frequency domain of the reception voice signal to be synthesized, each of the values of the frequency components included in the frame of the reception voice signal in frequency domain corresponding to the signal in time domain having the rate-of-speech change process applied, the weighted addition taking the ratio into account.

7. A non-transitory computer-readable recording medium having a program stored therein for causing a computer to execute a signal processing method for feeding a frame of a signal in frequency domain of a reception voice signal into a sound echo canceler, the method comprising:
    receiving firstly a plurality of the frames of the reception voice signal in frequency domain before having a rate-of-speech change process applied, the rate-of-speech change process being to be applied for changing a rate of speech of the reception voice signal;
    receiving secondly a plurality of the frames of a signal in time domain having the rate-of-speech change process applied by units of the frames; and
    synthesizing the frame of the signal in frequency domain of the reception voice signal to be fed into the sound echo canceler, based on the signal in time domain having the rate-of-speech change process applied at a frame currently being processed by the signal processing apparatus, and a frame of the reception voice signal in frequency domain corresponding to the signal in time domain having the rate-of-speech change process applied.

8. The non-transitory computer-readable recording medium as claimed in claim 7, wherein the synthesizing includes identifying a ratio of a length of a part of the signal in time domain having the rate-of-speech change process applied included in the frame currently being processed, to a length of the frame currently being processed, for the signal in time domain having the rate-of-speech change process applied,
    wherein the ratio is used for synthesizing the frame of the signal in frequency domain of the reception voice signal.

9. The non-transitory computer-readable recording medium as claimed in claim 8, wherein the synthesizing includes performing a weighted addition on values of frequency components for calculating a frame for the signal in frequency domain of the reception voice signal to be synthesized, each of the values of the frequency components included in the frame of the reception voice signal in frequency domain corresponding to the signal in time domain having the rate-of-speech change process applied, the weighted addition taking the ratio into account.

* * * * *